United States Patent [19]

Strepek

[11] Patent Number: 5,564,767
[45] Date of Patent: Oct. 15, 1996

[54] MOTORIZED EXTENDIBLE DRAWER APPARATUS FOR A VEHICLE

[76] Inventor: John E. Strepek, 16 N. 287 Randall Rd., Elgin, Ill. 60123

[21] Appl. No.: 294,447

[22] Filed: Aug. 23, 1994

[51] Int. Cl.$^6$ ................................................ B60P 1/42
[52] U.S. Cl. .................. 296/26; 200/61.61; 224/496; 296/37.6; 312/319.8; 312/334.47
[58] Field of Search .......................... 296/26, 37.6, 162, 296/39.2, 27, 37.9, 172, 165; 224/496, 510; 312/319.5, 319.8, 334.47, 330.1; 280/638, 166, 79.3; 200/61.61, 61.62

[56] References Cited

U.S. PATENT DOCUMENTS

| | | | |
|---|---|---|---|
| 1,075,088 | 10/1913 | Bruce . | |
| 2,468,579 | 4/1949 | Vuori | 296/26 |
| 2,784,027 | 3/1957 | Temp | 296/26 X |
| 2,797,104 | 6/1957 | Drobney et al. | 280/166 |
| 2,852,303 | 9/1958 | Hopson | 296/50 |
| 2,890,908 | 10/1961 | Mayer | 296/26 |
| 4,466,449 | 8/1984 | Summers | 296/37.9 X |
| 4,475,760 | 10/1984 | Morgan | 296/26 |
| 4,645,406 | 2/1987 | Cooper et al. | 414/500 |
| 4,824,158 | 4/1989 | Peters et al. | 296/37.6 |
| 4,830,242 | 5/1989 | Painter | 224/42.32 |
| 4,936,624 | 6/1990 | West | 296/37.6 |
| 4,966,401 | 10/1991 | Dutro et al. | 296/37.6 |
| 4,993,088 | 2/1991 | Chudik | 5/118 |
| 5,052,878 | 10/1991 | Brockhaus | 414/522 |
| 5,098,146 | 3/1992 | Albrecht et al. | 296/26 |
| 5,118,244 | 6/1992 | Cook | 414/528 |
| 5,127,697 | 7/1992 | St. Marie | 296/26 |
| 5,129,697 | 7/1992 | Helkkinen | 296/26 |
| 5,193,878 | 3/1993 | Weaver | 296/162 |
| 5,228,707 | 7/1993 | Yoder | 280/166 |
| 5,332,276 | 7/1994 | Blodgett, Jr. | 296/26 |
| 5,391,042 | 2/1995 | Song | 296/26 X |

OTHER PUBLICATIONS

Machine Design, Limit Switches, p. 31, paragraph 5.

*Primary Examiner*—David M. Mitchell
*Assistant Examiner*—Kia M. Robinson
*Attorney, Agent, or Firm*—Charles F. Meroni, Jr.

[57] ABSTRACT

A motorized extendible drawer apparatus for a vehicle is provided. The apparatus has a drawer slidably mounted to a frame. The drawer is extendible from the frame in a cantilever position for allowing access within the drawer. The frame has a tray mounted on a top side of the frame for additional storage. A pair of rails mounted to outside surfaces of the drawer engage a plurality of roller bearings mounted on the frame. A threaded rod is connected to the frame in a fixed position and at a height level above the drawer. A motor assembly is mounted to a back side of the drawer and to the threaded rod for moving the drawer in first and second directions. A switch mechanism for controlling the motor assembly is also provided.

21 Claims, 4 Drawing Sheets

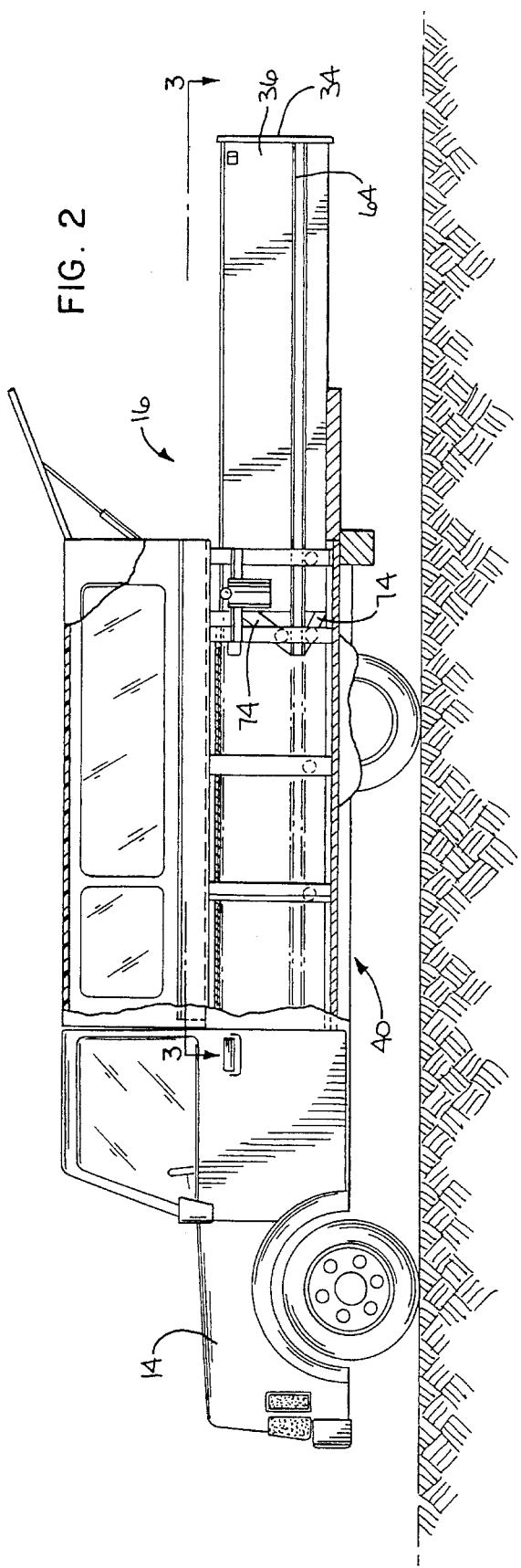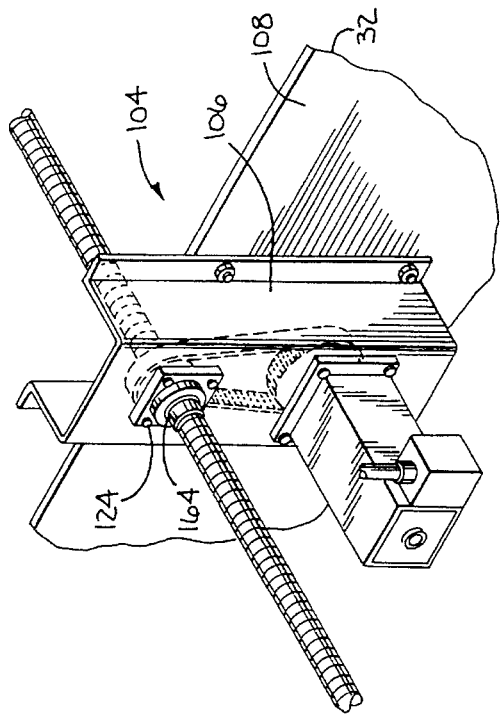

MOTORIZED EXTENDIBLE DRAWER APPARATUS FOR A VEHICLE

BACKGROUND OF THE INVENTION

1. Field of the Invention

The present invention relates generally to an extendible drawer apparatus for a vehicle. More particularly, the invention pertains to a motorized extendible drawer apparatus for a vehicle for automatically extending a drawer in a cantilever position.

2. Description of the Prior Art

Various types of extendible drawers or platforms for use with vehicles are known in the art. Generally, these devices are mounted to a truck bed of a pickup truck or similar type vehicle.

For example, U.S. Pat. No. 4,830,242, issued to Painter, discloses a tray apparatus for vehicles. A frame is mounted to the bed of the vehicle and a tray is movable from the frame. A wheel assembly is attached to the tray for supporting the tray when the tray is extended in a cantilever position. While this device does provide a satisfactory means for extending a drawer from a frame, it suffers from a number of disadvantages.

The Painter device requires the strength of a person to move the tray out to an extended position, as well as to move the tray back into a storage position within the frame. While this is feasible on a level surface, an unlevel surface will create a difficult or impossible situation. This problem is compounded when considering the fact that the tray capacity will allow for the storage of many items having a total weight possibly in the hundreds of pounds. An additional problem exists with the Painter's use of a wheel assembly. This wheel assembly is in engagement with the ground level when the tray is extended. An uneven or rough surface, such as one with rocks or gravel, will prevent the wheel assembly from easily moving.

Unlevel and rough surfaces, like those described above, are common at construction sites and in rural settings. Since the use of vehicles having a bed, such as pickup trucks, are more commonly used in these types of settings, a more desirable extendible drawer or tray apparatus would be one that was well constructed and adapted for carrying a heavy load, as well as being operative on any type of surface.

As will be described in greater detail hereinafter, the extendible drawer apparatus of the present invention differs from those previously proposed.

SUMMARY OF THE INVENTION

Accordingly, it is an object of this invention to provide an extendible drawer apparatus that is motorized for automatic movement of a drawer in a first and second direction.

Another object of this invention is provide a motor assembly that is easily accessible for maintenance or repair.

Still another object of this invention is to provide a motorized extendible drawer apparatus that is capable of automatically stopping when the drawer has reached a predetermined position.

Yet another object of this invention is to provide a motorized extendible drawer apparatus that is long lasting and can be inexpensively manufactured.

To achieve the foregoing and other objectives, and in accordance with the purposes of the present invention a motorized extendible drawer apparatus for a vehicle is provided. The apparatus includes a drawer slidably connected to a frame so that the drawer may be extended from the frame in a cantilever position allowing for access to an inside portion of the drawer. A threaded rod is connected to the frame by structure so that the threaded rod is in a fixed position at a height level above the drawer. A motor assembly is provided for moving the drawer in first and second directions, the motor assembly being operatively connected to the threaded rod.

In accordance with an aspect of the invention, a switch mechanism is provided. The switch mechanism controls the motor assembly.

In accordance with another aspect of the invention, the frame has a tray mounted on a top side of the frame. The tray has flat surface and is well suited for carrying lumber and other materials, such as 4'×8' sheets of construction materials.

Other objects, features and advantages of the invention will become more readily apparent upon reference to the following description when taken in conjunction with the accompanying drawings, which drawings illustrate several embodiments of the invention.

BRIEF DESCRIPTION OF THE DRAWINGS

In the drawings:

FIG. 2 is a side partial cross sectional view taken along line 2—2 of FIG. 1;

FIG. 5 is a perspective view of the motor assembly of the apparatus;

DETAILED DESCRIPTION OF THE PREFERRED EMBODIMENT

Figure 1:
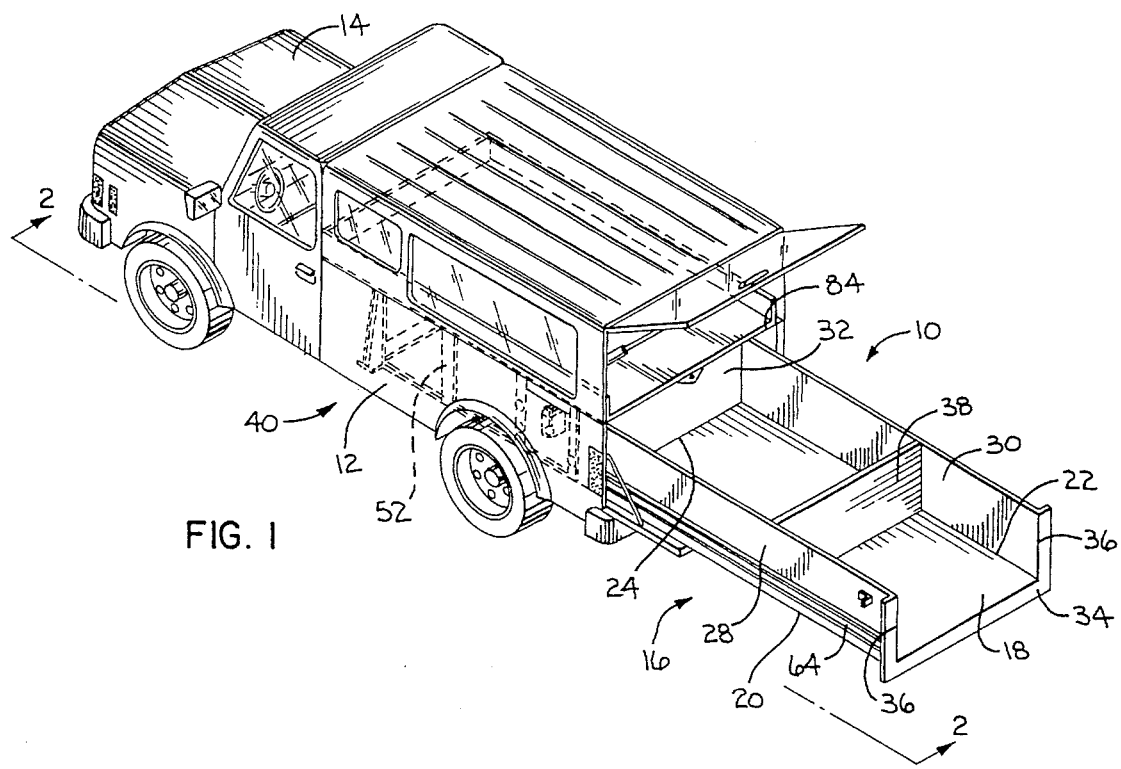
FIG. 1 is a perspective view of a vehicle having a motorized extendible drawer apparatus in an extended cantilever position, in accordance with the invention.

Referring now to the drawings, FIG. 1 shows a motorized extendible drawer apparatus 10. The apparatus 10 is mounted to a vehicle bed 12 of a vehicle 14. In FIG. 1, the apparatus 10 is shown in an extended cantilever position. The vehicle 14 is preferably a truck having a flat bed 12. However, any style of vehicle having a bed 12 or bed type surface will provide an appropriate structure for the apparatus 10, such as utility vehicles, vans, mini-vans, and station wagons.

The apparatus 10 has a drawer 16. The drawer 16 is preferably formed of metal and has drawer floor 18. The drawer floor 18 has a first side floor edge 20, a second side floor edge 22, a back side floor edge 24, and a front side floor edge 26. A first drawer side 28 is connected or welded perpendicular to the floor 18 along the first side floor edge 20. A second drawer side 30 is connected or welded perpendicular to the floor 18 along the second side floor edge 22. A back drawer side 32 is connected or welded perpendicular to the floor 18 along the back side floor edge 24. A front drawer flange 34 may be connected or welded along the front side floor edge 26 and along front edges 36 of the first drawer side 28 and the second drawer side 30. The front drawer flange 34 adds additional stability to the drawer 16. A cross support side 38 is connected perpendicular to the floor 18 and parallel to and in a spaced apart relationship with the back drawer side 32. The cross support side 38 adds additional stability to the drawer 16, as well as forming two compartments within the drawer 16. It is to be understood that all connections between metal elements or components may be welded or connected by any other conventional connecting means, unless specifically stated otherwise.

Figure 4:
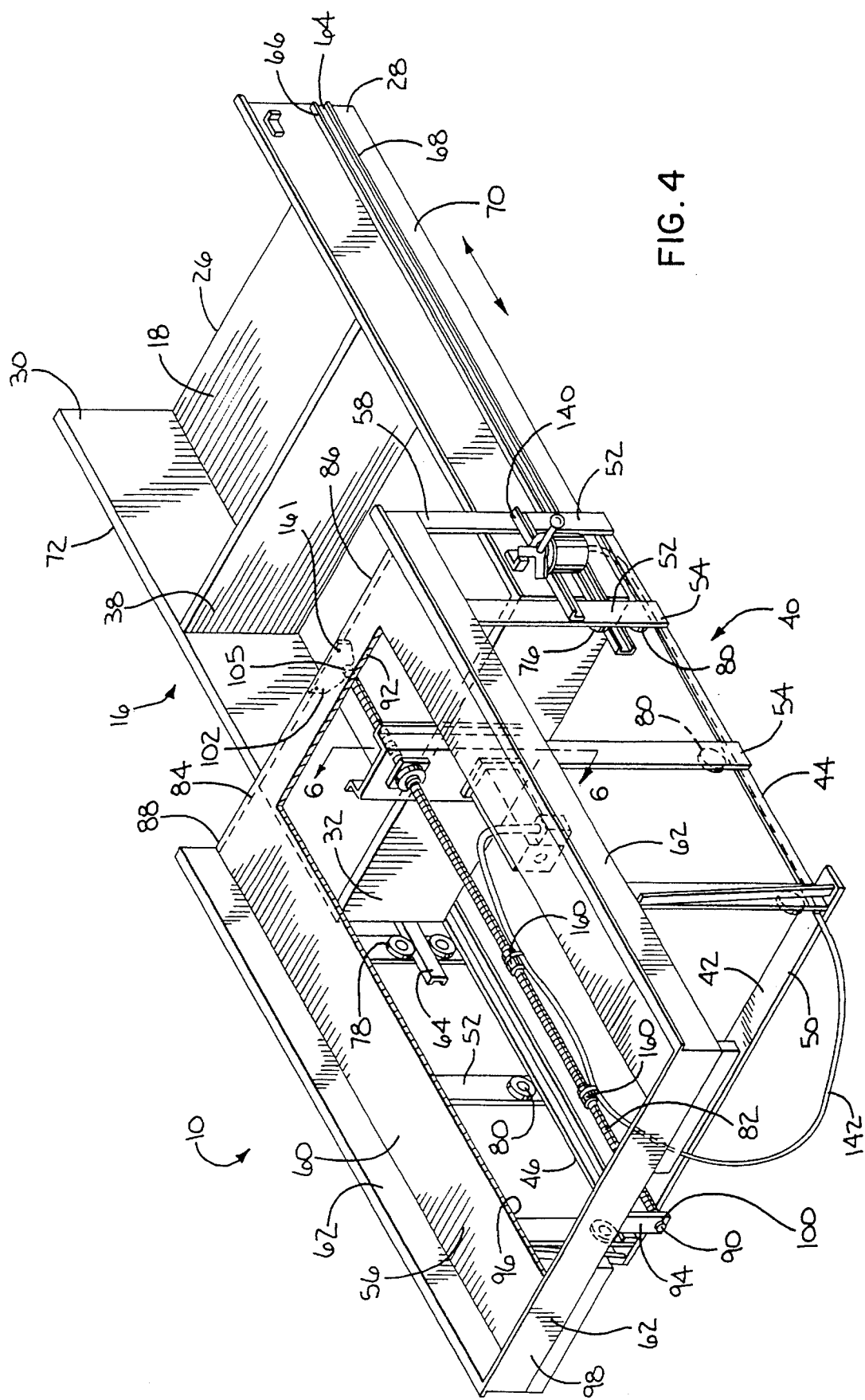
FIG. 4 is a partial cross sectional perspective view, in accordance with the invention.

As best illustrated in FIG. 4, the apparatus has a metal frame 40. The frame 40 has a rectangular base 42. The base 42 has a first side 44, a second side 46, a front side 48, and a back side 50. A plurality of vertical side supports 52 are connected perpendicular along the first side 44 and the second side 46 of the base 42 at a bottom end 54 of the vertical side supports 52. The frame 40 has a cross support 84 having a first end 86 and a second end 88. The first end 86 is connected to a top end 58 of a vertical side support 52 on one side of the frame 40, the second end 88 is connected a top end 58 of a vertical side support 52 on another side of the frame 40. The cross support 84 is parallel to and in a spaced apart relationship with the front side 48 of the base 42. The frame further has a metal tray 56 mounted on a top side of the frame 40. The tray 56 is connected to the top end 58 of the vertical side supports 52 and the cross support 84. The tray 56 has flat surface 60 and tray side walls 62 on three of four sides thereof. The tray 56 is mounted above the drawer 16 and is well suited for carrying lumber and other materials, such as 4'×8' sheets of construction materials.

Referring to FIGS. 2 and 4, means for slidably connecting the drawer 16 within the frame 40 is provided so that the drawer 16 may be extended from the frame in a cantilever position allowing for access to an inside portion of the drawer 16. In a preferred manner of carrying out the means for slidably connecting the drawer 16 within the frame 40, a pair of elongated metal rails 64, such as channel rails, are provided. The rails 64 have a top flange 66 and a bottom flange 68. One of the rails 64 is horizontally mounted to a first outside surface 70 of the first drawer side 28. Another rail 64 is horizontally mounted to a second outside surface 72 of the second drawer side 30. In a preferred embodiment, the rails 64 extend horizontally beyond the back drawer side 32, as shown in the drawings. Extending the rails 64 in such a fashion allows for additional extension of the drawer 16 in a cantilever position while still maintaining a sturdy engagement with the frame 40. Additional rail support members 74 connected to the drawer 16 and to the rails 64, as shown in FIG. 2, may be used to give the rails 64 further stability.

Rollers or roller bearings of conventional design may be connected to frame at various locations for rotational engagement with the rails 64. In a preferred configuration, a first roller bearing 76 is rotationally mounted to a vertical side support 52 on one side of the frame 40. The first roller bearing 76 is in rotational engagement with the top flange 66 of the rail 64 on the first drawer side 28. A second roller bearing 78 is rotationally mounted to a vertical side support 52 on another side of the frame 40. The second roller bearing 78 is in rotational engagement with the top flange 66 of the rail 64 on the second drawer side 30. The first roller bearing 76 and the second roller bearing 78 maintain a rotational engagement with the rails 64 at all times during movement of the drawer 16 and prevent the drawer 16 from dropping out of the frame 40 when the drawer 16 is extended in a cantilever position. A plurality of additional roller bearings 80 are rotationally mounted to the vertical side supports 52. The roller bearings 80 are in rotational engagement with the bottom flange 68 of the rails 64. The roller bearings 80 carry the downward weight of the drawer 16.

Referring to FIG. 4, a metal coil or threaded rod 82 is shown. The threaded rod 82 has a first rod end 90 and a second rod end 92. A first bracket 94 having a first bracket aperture 100 is connected to a bottom tray side 96 at a back tray end 98. The first rod end 90 of the threaded rod 82 engages the aperture 100 and is secured to the bracket by a weld or other similar securing means. A second bracket 102 having a second bracket aperture 104 is bolted or screwed to the cross support 84 of the frame 40 with screws 161. The second rod end 92 engages the aperture 105 of the second bracket 102, but the threaded rod 82 is not welded to the second bracket 102, in a preferred alternative embodiment. When the threaded rod 82 is not welded, the second bracket 102 may be removed allowing for easy removal of the drawer 16 to make repairs or conduct maintenance on a motor assembly attached to the back of the drawer and to the threaded rod 82, which will be later discussed. Preferably, the threaded rod 82 is connected to the frame 40 parallel to and approximately equal distance from the first side 44 and the second side 46 of the base 42 so that the threaded rod is in a fixed position at a height level above the drawer 16 and parallel to and below the tray 56.

Figure 6:
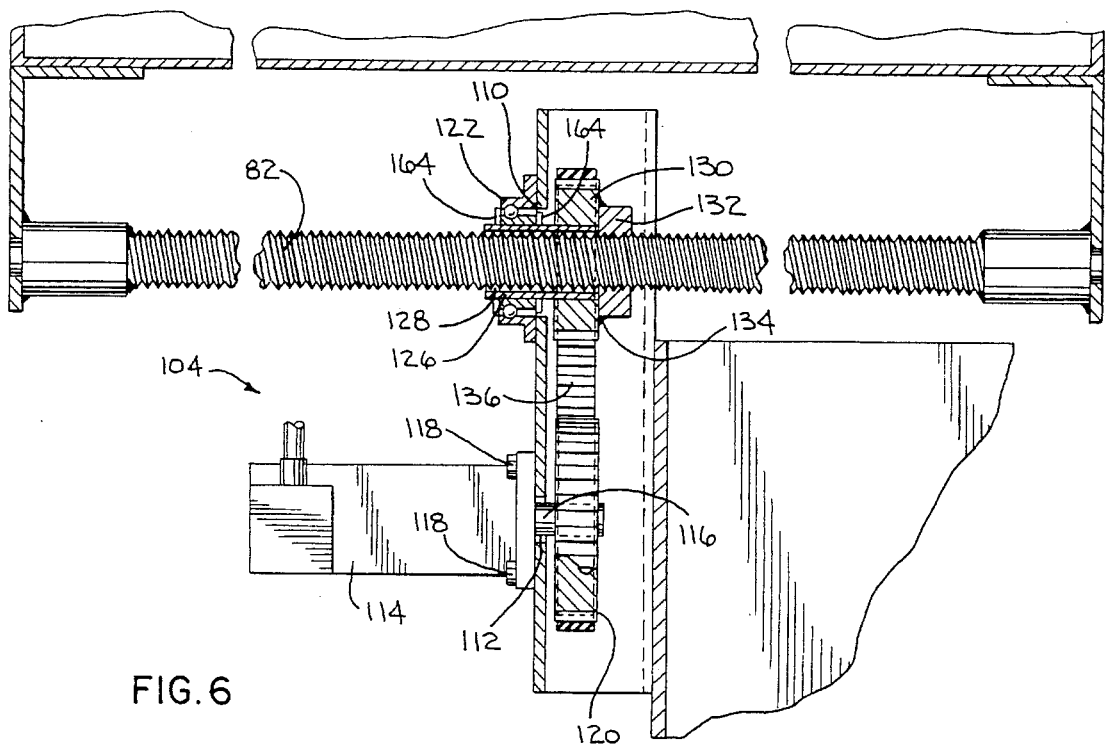
FIG. 6 is a side partial cross sectional view of the motor assembly taken along line 6—6 of FIG. 4.

Referring now to FIGS. 5 and 6, a motor assembly 104 is provided for moving the drawer 16 in first and second directions. The motor assembly 104 includes a metal U-shaped motor bracket 106 bolted to a third outside surface 108 of the back drawer side 32. The motor bracket 106 has a first bracket aperture 110 and a second bracket aperture 112. A motor means or motor 114 is operatively mounted or bolted to the motor bracket 106 with bolts 118. Preferably, the motor 114 is a reversible 12 volt DC motor, of conventional design, having between ¼ to ½ hp. However, it is to be understood that a smaller or larger motor 114 may be preferred depending on the overall size of the apparatus 10, which is dependent on the type of vehicle 14 used. For example, a large heavy duty type of the apparatus 10 for use in a full size pickup truck will work best with a motor 114 having at least ½ hp, whereas a small scale type of the apparatus 10 for use in small utility vehicle may only require a ¼ hp motor 114. The motor 114 is powered from the battery of the vehicle 14. Alternatively, a separate 12 volt DC car or truck battery could be used.

A motor shaft 116 of the motor 114 is inserted through the second bracket aperture 112 and is connected to a second pulley 120. A thrust bearing 122 is bolted to the bracket with bolts 124. The bearing 122 has a cylindrical bearing guide 126 inserted therethrough, as best illustrated in FIG. 6. The cylindrical bearing guide 126 is in rotational engagement with the bearing 122 and has a guide aperture 128 for insertion of the threaded rod 82 therethrough. The threaded rod 82 and guide 126 extend through the first bracket aperture 110 of the motor bracket 106. Snap rings 164, such as expandable snap rings of conventional design, may be inserted around the cylindrical bearing guide 126 on either sides of the bearing 122. Preferably, grooves are cut into the cylindrical bearing guide 126 for engagement of the snap ring 164. A first pulley 130 is welded to the cylindrical bearing guide for rotation around the threaded rod 82. The first pulley 130 has a threaded portion 132 welded to or formed integral with the first pulley 130. Preferably, the threaded portion 132 is a threaded nut welded to an outside surface 134 of the first pulley 130. The threaded portion 132 is in threaded engagement with the threaded rod 82. By welding a nut to the first pulley 130, conventional components may be utilized without having to have a specially constructed and tapped threaded pulley, which reduces the cost of manufacturing the apparatus 10. A timing belt 136 operatively engages the first pulley 130 and the second pulley 120 for transferring rotational movement of the motor shaft 116 to the threaded portion 132 to move the motor assembly 104 along the threaded rod 82. It is to be understood that other types of bearings and pulleys of conventional design and known to one skilled in the art could equally be used in transferring the rotational movement of the motor shaft 116 to the threaded portion 132.

Figure 3:
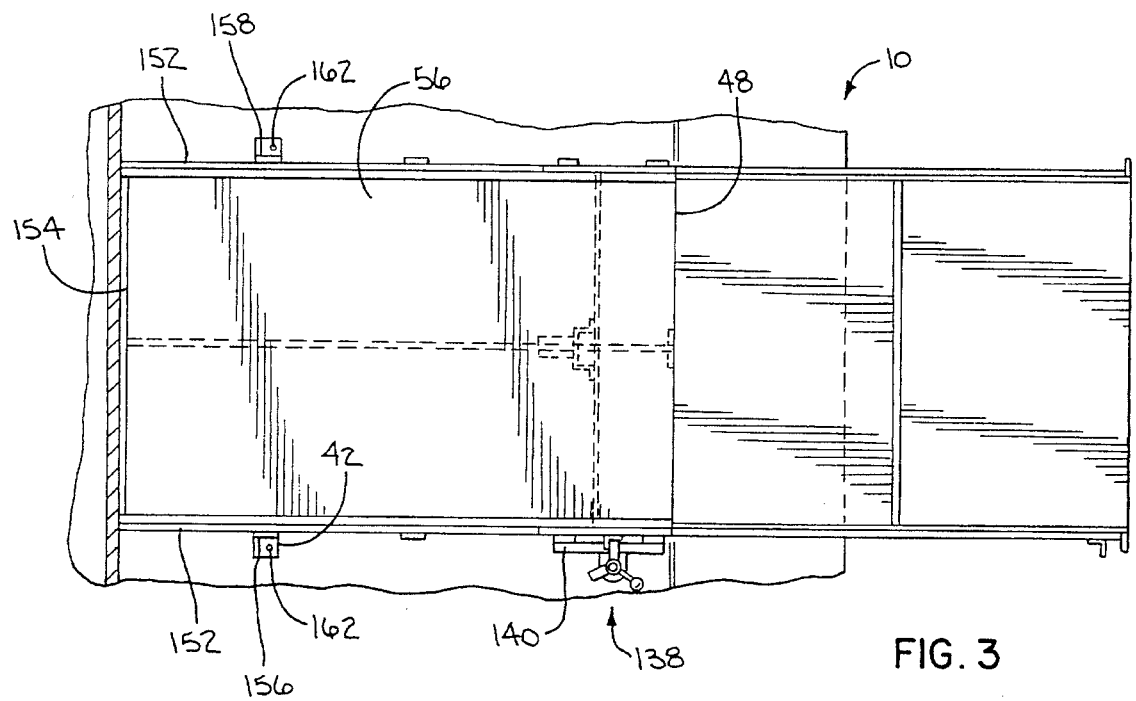
FIG. 3 is a top partial cross sectional view taken along line 3—3 of FIG. 2.

Referring now to FIG. 3 and 4, a switching means or switching mechanism 138 is provided for controlling the motor 114. A horizontal cross member 140 is welded between two vertical side supports 52. The switching mechanism 138 is physically connected to the cross member 140 and electrically connected to the motor 114 by a cable 142. In order to keep the cable 142 from tangling within the frame 40, a plurality of plastic or metal sleeves 160 are slidably engaged to the threaded rod 82. The cable 142 is attached to the sleeves 160 by a plastic tie or tape. When the drawer moves into and out of the frame 40, the cable 142 will pull the sleeves along the threaded rod 82 preventing the cable 142 from getting damaged.

Figure 7:
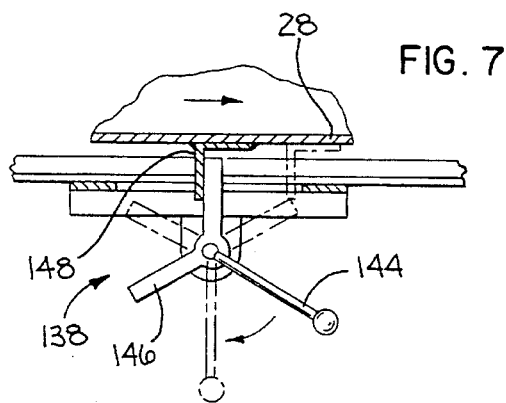
FIG. 7 is a top cross sectional view of the switch mechanism showing the operation of the switch mechanism when the drawer is moving in a first direction, in accordance with the invention.
Figure 8:
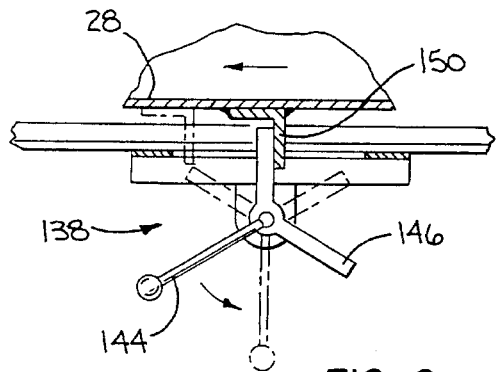
FIG. 8 is a top cross sectional view of the switch mechanism showing the operation of the switch mechanism when the drawer is moving in a second direction, in accordance with the invention.
Figure 9:
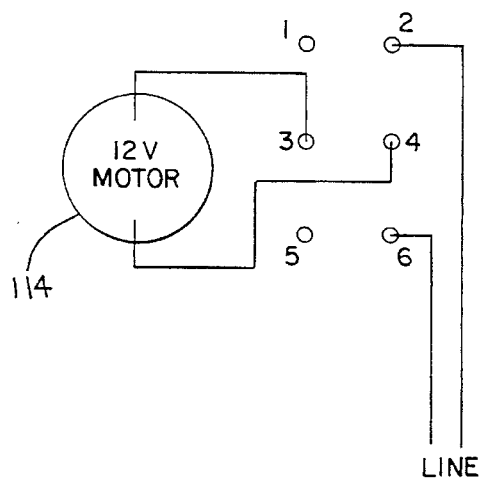
FIG. 9 is a schematic circuit view of the switch mechanism connected to a motor.

As best illustrated in FIGS. 7 and 8, the switch mechanism 138 has a switch lever 144 pivotally connected to the switch mechanism 138 for operating the switch mechanism. The switch lever 144 has a center neutral position, a left position for moving the drawer in the first direction, and a right position for moving the drawer in the second direction. Preferably, the switch mechanism is a drum barrel switch of conventional design. A schematic circuit view of the switch mechanism 138 connected to the motor 114 is shown generally in FIG. 9.

An L-shaped lever activator 146 is operatively connected to the switch lever 144. The switch mechanism is spring load when the switch lever is engaged into the right and left positions. Referring to FIG. 7, a first tab 148 is welded to the first drawer side 28 at a predetermined position towards the back drawer side 32 for temporary engagement with the L-shaped lever activator when the drawer is moving in the first direction so that the L-shaped lever activator moves the switch lever into the neutral position and stops the drawer 16 when it is fully extended. Referring to FIG. 8, a second tab 150 is welded to the first drawer side 28 at a predetermined position towards front drawer flange 34 for temporary engagement with the L-shaped lever activator when the drawer is moving in the second direction so that the L-shaped lever activator moves the switch lever into the neutral position and stops the drawer 16 when it is fully nested within the frame 40.

Referring now to FIG. 3, a pair of vertical side panels 152 are mounted to the frame 40 across the vertical side supports 52 and below the tray 56 to enclose the sides of the frame 40. A vertical back panel 154 is mounted to the frame 40 to enclose the back portion of the frame 40. The apparatus 10 is mounted to the vehicle bed 12 by bolting the base 42 of the frame 40 to the bed with bolts or screws 162 at corners of the base 42. Two important locations to connect the apparatus 10 to the bed 12 are located at a first back side end 156 and a second back side end 158 of the back side 50 of the base 42, shown in FIG. 3. Since these positions are on the back side 50 of the base 42, they will secure the apparatus 10 to the vehicle 14 when the drawer 16 is cantilever mounted from the frame 40 and upward forces are being exerted to the back side 50.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A motorized extendible drawer apparatus for a vehicle having a cargo area with side walls and a horizontally disposed vehicle bed, comprising:
   (a) a drawer having first and second drawer sides, the drawer sized for fitted nested engagement in the cargo area of the vehicle with the first and second drawer sides in close adjacency to respective side walls of the cargo area;
   (b) a frame secured to the vehicle bed;
   (c) means for slidably connecting the drawer within the frame so that the drawer may be extended from the frame in a cantilever position allowing for access to an inside portion of the drawer;
   (d) a threaded rod, means for connecting opposite ends of the threaded rod to the frame so that the threaded rod is in a rigidly secured position at a height level above the drawer; and
   (e) motorized means for moving the drawer in first and second directions, the motorized means being operatively connected to the threaded rod and connected to the drawer for movement therewith.

2. The apparatus of claim 1, further comprising switching means controlling the motorized means.

3. The apparatus of claim 2, further comprising means for automatically controlling the switching means to stop the motorized means when the drawer has reached a predetermined position.

4. The apparatus of claim 1, wherein the frame has a tray mounted on a top side of the frame.

5. A motorized extendible drawer apparatus for a vehicle having a cargo area with side walls and a horizontally disposed vehicle bed, comprising:
   (a) a drawer having a drawer floor, the drawer floor having a first side floor edge, a second side floor edge, and a back side floor edge, a first drawer side connected perpendicular to the floor along the first side floor edge, a second drawer side connected perpendicular to the floor along the second side floor edge, a back drawer side connected perpendicular to the floor along the back side floor edge, the drawer sized for fitted nested engagement in the cargo area of the vehicle with the first drawer side and second drawer side in close adjacency to respective side walls of the cargo area;
   (b) a frame secured to the vehicle bed, the frame having a rectangular base, the base having a first side, a second side, and a back side, a plurality of vertical side supports connected perpendicular along the first side and the second side of the base at a bottom end of the vertical side supports, the frame having a tray mounted on a top side of the frame, the tray being connected to a top end of the vertical side supports;
   (c) means for slidably connecting the drawer within the frame so that the drawer may be extended from the frame in a cantilever position allowing for access to an inside portion of the drawer;

(d) a threaded rod, means for connecting opposite ends of the threaded rod to the frame parallel to and approximately equal distance from the first side and the second side of the base so that the threaded rod is in a rigidly secured position at a height level above the drawer; and (e) motorized means having a minimum of approximately ¼ hp for moving the drawer in first and second directions, the motorized means being operatively connected to the threaded rod and connected to the drawer for movement therewith.

6. The apparatus of claim 5, further comprising switching means controlling the motorized means.

7. The apparatus of claim 6, wherein the switching means controlling the motorized means is a switch mechanism electrically connected to the motorized means, the switch mechanism having a switch lever pivotally connected to the switch mechanism, the switch lever having a center neutral position, the switch lever having a left position for moving the drawer in the first direction, and the switch lever having a right position for moving the drawer in the second direction.

8. The apparatus of claim 7, further comprising means for automatically controlling the switching means to stop the motorized means when the drawer has reached a predetermined position.

9. The apparatus of claim 8, wherein the means for automatically controlling the switching means to stop the motorized means when the drawer has reached a predetermined position, comprises:

(a) an L-shaped lever activator operatively connected to the switch lever;

(b) means connected to the switch lever for spring loading the switch lever when the switch lever is engaged into the right and left positions;

(c) means for operatively connecting the switch mechanism to the frame;

(d) a first tab connected to the first drawer side at a predetermined position for temporary engagement with the L-shaped lever activator when the drawer is moving in the first direction so that the L-shaped lever activator moves the switch lever into the neutral position; and (e) a second tab connected to the first drawer side at a predetermined position for temporary engagement with the L-shaped lever activator when the drawer is moving in the second direction so that the L-shaped lever activator moves the switch lever into the neutral position.

10. The apparatus of claim 5, further comprising a pair of vertical side panels mounted to the frame, and a vertical back panel mounted to the frame.

11. The apparatus of claim 5, wherein the motorized means for moving the drawer in first and second directions, comprises:

(a) a motor bracket mounted to an outside surface of the back drawer side;

(b) a motor operatively mounted to the bracket;

(c) a bearing operatively mounted to the bracket, the bearing having a cylindrical bearing guide, the cylindrical bearing guide having an aperture for insertion of the threaded rod therethrough;

(d) a first pulley operatively connected to the cylindrical bearing guide, the first pulley having a threaded portion connected thereto, the threaded portion being in threaded engagement with the threaded rod;

(e) a second pulley operatively connected to the motor; and (f) a timing belt operatively engaging the first pulley and the second pulley.

12. The apparatus of claim 5, wherein the means for slidably connecting the drawer within the frame so that the drawer may be extended from the frame in a cantilever position allowing for access to an inside portion of the drawer, comprises:

(a) a pair of rails having a top flange and a bottom flange, one of the rails being horizontally mounted to a first outside surface of the first drawer side, another rail being horizontally mounted to a second outside surface of the second drawer side;

(b) a first roller bearing rotationally mounted to a vertical side support on one side of the frame, the first roller bearing being in rotational engagement with the top flange of the rail on the first drawer side;

(c) a second roller bearing rotationally mounted to a vertical side support on another side of the frame, the second roller bearing being in rotational engagement with the top flange of the rail on the second drawer side; and (d) a plurality of additional roller bearings rotationally mounted to the vertical side supports, the roller bearings being in rotational engagement with the bottom flange of the rails.

13. The apparatus of claim 5, further comprising means for mounting the frame to the vehicle.

14. A motorized extendible drawer apparatus for a vehicle having a cargo area with side walls and a horizontally disposed vehicle bed, comprising in combination:

(a) a drawer having a drawer floor, the drawer floor having a first side floor edge, a second side floor edge, and a back side floor edge, a first drawer side connected perpendicular to the floor along the first side floor edge, a second drawer side connected perpendicular to the floor along the second side floor edge, a back drawer side connected perpendicular to the floor along the back side floor edge, the drawer sized for fitted nested engagement in the cargo area of the vehicle with the first drawer side and second drawer side in close adjacency to respective side walls of the cargo area;

(b) a frame secured to the vehicle bed, the frame having a rectangular base, the base having a first side, a second side, and a back side, a plurality of vertical side supports connected perpendicular along the first side and the second side of the base at a bottom end of the vertical side supports, the frame having a tray mounted on a top side of the frame, the tray being connected to a top end of the vertical side supports;

(c) a pair of rails having a top flange and a bottom flange, one of the rails being horizontally mounted to a first outside surface of the first drawer side, another rail being horizontally mounted to a second outside surface of the second drawer side;

(d) a first roller bearing rotationally mounted to a vertical side support on one side of the frame, the first roller bearing being in rotational engagement with the top flange of the rail on the first drawer side;

(e) a second roller bearing rotationally mounted to a vertical side support on another side of the frame, the second roller bearing being in rotational engagement with the top flange of the rail on the second drawer side;

(f) a plurality of additional roller bearings rotationally mounted to the vertical side supports, the roller bearings being in rotational engagement with the bottom flange of the rails so that the drawer may be extended from the frame in a cantilever position allowing for access to an inside portion of the drawer;

(g) a threaded rod, means for connecting opposite ends of the threaded rod to the frame parallel to and approximately equal distance from the first side and the second side of the base so that the threaded rod is in a rigidly secured position at a height level above the drawer;

(h) a motor bracket mounted to a third outside surface of the back drawer side;

(i) a motor means having a minimum of approximately ¼ hp operatively mounted to the bracket for moving the drawer in first and second directions and for movement with the drawer;

(j) a bearing operatively mounted to the bracket, the bearing having a cylindrical bearing guide, the cylindrical bearing guide having an aperture for insertion of the threaded rod therethrough;

(k) a first pulley operatively connected to the cylindrical bearing guide, the first pulley having a threaded portion connected thereto, the threaded portion being in threaded engagement with the threaded rod;

(l) a second pulley operatively connected to the motor means; and (m) a timing belt operatively engaging the first pulley and the second pulley.

15. The apparatus of claim 14, further comprising switching means controlling the motorized means.

16. The apparatus of claim 15, wherein the switching means controlling the motorized means is a switch mechanism electrically connected to the motorized means, the switch mechanism having a switch lever pivotally connected to the switch mechanism, the switch lever having a center neutral position, the switch lever having a left position for moving the drawer in the first direction, and the switch lever having a right position for moving the drawer in the second direction.

17. The apparatus of claim 16, further comprising means for automatically controlling the switching means to stop the motorized means when the drawer has reached a predetermined position.

18. The apparatus of claim 17, wherein the means for automatically controlling the switching means to stop the motorized means when the drawer has reached a predetermined position, comprises:

(a) an L-shaped lever activator operatively connected to the switch lever;

(b) means connected to the switch lever for spring loading the switch lever when the switch lever is engaged into the right and left positions;

(c) means for operatively connecting the switch mechanism to the frame;

(d) a first tab connected to the first drawer side at a predetermined position for temporary engagement with the L-shaped lever activator when the drawer is moving in the first direction so that the L-shaped lever activator moves the switch lever into the neutral position; and (e) a second tab connected to the first drawer side at a predetermined position for temporary engagement with the L-shaped lever activator when the drawer is moving in the second direction so that the L-shaped lever activator moves the switch lever into the neutral position.

19. The apparatus of claim 14, further comprising a pair of vertical side panels mounted to the frame, and a vertical back panel mounted to the frame.

20. The apparatus of claim 14, further comprising means for mounting the frame to the vehicle.

21. A motorized extendible drawer apparatus for a vehicle, comprising:

(a) a drawer having a drawer floor, the drawer floor having a first side floor edge, a second side floor edge, and a back side floor edge, a first drawer side connected perpendicular to the floor along the first side floor edge, a second drawer side connected perpendicular to the floor along the second side floor edge, a back drawer side connected perpendicular to the floor along the back side floor edge;

(b) a frame having a rectangular base, the base having a first side, a second side, and a back side, a plurality of vertical side supports connected perpendicular along the first side and the second side of the base at a bottom end of the vertical side supports, the frame having a tray mounted on a top side of the frame, the tray being connected to a top end of the vertical side supports;

(c) means for slidably connecting the drawer within the frame so that the drawer may be extended from the frame in a cantilever position allowing for access to an inside portion of the drawer;

(d) a threaded rod, means for connecting the threaded rod to the frame parallel to and approximately equal distance from the first side and the second side of the base so that the threaded rod is in a fixed position at a height level above the drawer;

(e) motorized means for moving the drawer in first and second directions, the motorized means being operatively connected to the threaded rod;

(f) a switch mechanism electrically connected to the motorized means, the switch mechanism having a switch lever pivotally connected to the switch mechanism, the switch lever having a center neutral position, the switch lever having a left position for moving the drawer in the first direction, and the switch lever having a right position for moving the drawer in the second direction; and (g) means for automatically controlling the switching means to stop the motorized means when the drawer has reached a predetermined position comprising: an L-shaped lever activator operatively connected to the switch lever; means connected to the switch lever for spring loading the switch lever when the switch lever is engaged into the right and left positions; means for operatively connecting the switch mechanism to the frame; a first tab connected to the first drawer side at a predetermined position for temporary engagement with the L-shaped lever activator when the drawer is moving in the first direction so that the L-shaped lever activator moves the switch lever into the neutral position; and a second tab connected to the first drawer side at a predetermined position for temporary engagement with the L-shaped lever activator when the drawer is moving in the second direction so that the L-shaped lever activator moves the switch lever into the neutral position.

* * * * *